United States Patent
Ahmed

(10) Patent No.: US 9,955,817 B2
(45) Date of Patent: *May 1, 2018

(54) COOKING GRATE ASSEMBLY AND COOKING APPARATUS

(71) Applicant: W.C. BRADLEY CO., Columbus, GA (US)

(72) Inventor: Mallik Ahmed, Columbus, GA (US)

(73) Assignee: W.C. Bradley Co., Columbus, GA (US)

(*) Notice: Subject to any disclaimer, the term of this patent is extended or adjusted under 35 U.S.C. 154(b) by 922 days.

This patent is subject to a terminal disclaimer.

(21) Appl. No.: 14/336,494

(22) Filed: Jul. 21, 2014

(65) Prior Publication Data
US 2014/0345479 A1    Nov. 27, 2014

Related U.S. Application Data

(63) Continuation of application No. 13/039,646, filed on Mar. 3, 2011, now Pat. No. 8,813,738.

(51) Int. Cl.
*A47J 37/06* (2006.01)

(52) U.S. Cl.
CPC ....... *A47J 37/0694* (2013.01); *A47J 37/0682* (2013.01)

(58) Field of Classification Search
CPC .. A47J 37/0682; A47J 37/0694; A47J 37/067; A47J 37/0704
See application file for complete search history.

(56) References Cited

U.S. PATENT DOCUMENTS

| | | | |
|---|---|---|---|
| 1,103,992 A | 7/1914 | Murray | |
| 3,225,682 A | 12/1965 | Savio | |
| 3,481,320 A | 8/1968 | Schaefer | |
| 3,424,145 A | 1/1969 | Stitt | |
| 5,355,780 A | 10/1994 | Campbell | |
| 5,755,154 A | 5/1998 | Schroeter et al. | |
| 6,260,478 B1 | 7/2001 | Harneit | |
| 6,314,870 B1 | 11/2001 | Staller et al. | |
| 6,362,458 B1 | 3/2002 | Sargunam et al. | |
| 6,931,985 B1 | 8/2005 | Attie | |
| 7,210,402 B2 | 5/2007 | Han et al. | |
| 7,241,466 B2 | 7/2007 | Dellinger | |
| 7,640,929 B2 | 1/2010 | Johnson et al. | |
| 7,810,484 B2 | 10/2010 | Schlosser et al. | |
| 7,810,487 B2 | 10/2010 | Johnston | |
| 7,905,225 B2 | 3/2011 | Contarino | |
| 8,037,879 B2 | 10/2011 | Murrin et al. | |
| 8,813,738 B2 * | 8/2014 | Ahmed | A47J 37/0682 126/152 R |

(Continued)

*Primary Examiner* — Alfred Basichas
(74) *Attorney, Agent, or Firm* — David G. Woodrai; Gable Gotwals

(57) ABSTRACT

A grate assembly for cooking food products and a grilling apparatus which uses the grate assembly for supporting the food during cooking. The grate assembly comprises: (a) a lower grate element having a series of parallel peak structures with valleys therebetween and (b) an upper grate element having a series of parallel food support ribs which are sized and spaced such that each rib will be positioned over the top of a corresponding peak structure. The upper food contacting surfaces of the ribs will remain substantially rust-free at atmospheric and cooking conditions.

20 Claims, 5 Drawing Sheets

(56) References Cited

U.S. PATENT DOCUMENTS

| | | |
|---|---|---|
| 2002/0189604 A1 | 12/2002 | McKenzie |
| 2007/0125357 A1 | 6/2007 | Johnston |
| 2009/0090348 A1 | 4/2009 | Contarino |
| 2009/0202688 A1 | 8/2009 | Best |
| 2009/0308374 A1 | 12/2009 | Ahmed |
| 2010/0006083 A1 | 1/2010 | Educate et al. |
| 2010/0132689 A1 | 6/2010 | Contarino |

* cited by examiner

COOKING GRATE ASSEMBLY AND COOKING APPARATUS

CROSS-REFERENCE TO RELATED APPLICATIONS

This is a continuation of co-pending U.S. patent application Ser. No. 13/039,646, filed Mar. 3, 2011, entitled COOKING GRATE ASSEMBLY AND COOKING APPARATUS, the contents of which are hereby incorporated by reference.

FIELD OF THE INVENTION

The present invention relates to cooking grates and grate assemblies which support food items for cooking in outdoor grills and in other cooking systems. The invention also relates to cooking systems which utilize such grates or grate assemblies.

BACKGROUND OF THE INVENTION

Outdoor grilling systems which utilize infrared radiant energy for cooking food items are known in the art. The beneficial results which these systems are capable of providing over conventional convective grills are also well known. However, there are various shortcomings and deficiencies which are often associated with many current infrared systems.

Even if formed of a common stainless steel or similar material, most food support grates heretofore used in infrared and other outdoor grills will begin to rust after a relatively short period of use. This oxidation process not only shortens the life of the grate, but the particles and/or flakes of the oxidized rust material which form on the grate surface also adhere to the food product.

To prevent rust from forming on the food contacting surface, the grate can be formed of a metal material which is highly resistant to rusting. However, such materials are cost prohibitive for use in most grilling systems and/or are not well suited for grilling at high temperatures.

Alternatively, or in addition, the grate could be coated with a coating material which is highly resistant to oxidation even at high temperatures. However, coating a cooking grate with such material can also be cost prohibitive for most grilling apparatuses. Moreover, the application of such a coating to an infrared grate can clog any air flow openings through the grate surface and can create other problems and difficulties which will increase both the complexity and the cost of the manufacturing process.

Another serious deficiency encountered with current infrared cooking grates is their susceptibility to flare-ups caused by the ignition of fat and grease materials which collect on top of the grate during cooking. Such flare-ups have a significant detrimental effect on the quality, consistency, reliability, and evenness of the cooking process.

Moreover, the collection of the fat and grease materials also interferes with and reduces the emission of infrared cooking energy from the grate. In addition to forming a coating on the grate surfaces, the grease and fat will also cool the emitting surfaces of the grate significantly. In this regard, the grease and fat which drips from a meat product while cooking will typically be at a temperature of about 120°-160° F. when it first strikes the grate. Consequently, the resultant energy transfer and temperature loss from the grate which occur as the grate heats the accumulated grease and fat to an ignition temperature of about 600°-650° F. can be substantial.

In an effort to prevent flare-ups from occurring on the top of some prior two-piece grate assemblies having flat lower radiating plates, holes have been provided through the flat plates for draining the grease and fat. In some cases, the placement of the upper grate element on top of the flat lower plate element forms substantially rectangular channels wherein the holes are located. However, in these prior two-piece grate designs and configurations, the nature and large size of the holes needed to quickly and effectively drain the grease and fat from the flat lower plate before it reaches ignition temperature would, in actuality, simply result in one flare-up problem being replaced with another. Specifically, with the addition of holes in the lower plate of a sufficient size to achieve quick drainage, the prior two-piece assemblies would no longer be capable of arresting flames caused by the flare-up of the grease and fat beneath the grate. Rather, the flames would pass upwardly through the drainage holes and into the cooking area.

Examples of further shortcomings and deficiencies commonly encountered in existing infrared grilling systems include: cleaning difficulties created by small gaps, crevices, and other features which can be difficult to reach; the need to use expensive infrared burners or other high-cost heating systems in order to provide the degree of performance and results desired; and the need to use a separate infrared emitter plate or other emitting structure positioned intermediate the burner and the food support grate or grate assembly.

Consequently, a need currently exists for an improved cooking grate assembly for infrared grills which will: (a) provide a substantially rust-free food contacting surface throughout the useful life of the grill; (b) provide high efficiency operation and a high infrared percentage of overall heat flux; (c) reduce or eliminate flare-ups on top of the grate assembly; (d) reduce or eliminate the penetration of flames upwardly through the cooking surface; (e) allow low cost burners or other heating elements or heat sources to be used for providing excellent cooking results; (f) eliminate the need for a separate emitter plate or other structure intermediate the burner and the grate assembly; and (g) accomplish these results without increasing the complexity or difficulty of the manufacturing process.

SUMMARY OF THE INVENTION

The present invention provides an improved cooking grate assembly and an improved cooking system which satisfy the needs and alleviate the problems discussed above. The inventive cooking grate assembly preferably comprises: (a) a lower grate element which greatly reduces or eliminates the occurrence of flare-ups thereon, as well as the upward penetration of flames therethrough, and (b) a removable upper grate element which provides a substantially rust-free cooking surface for food products.

In one aspect, there is provided a grate assembly for cooking a food product comprising a lower grate element and an upper grate element wherein it is preferred that:
  The lower grate element comprises a series of at least substantially parallel peak structures;
  The lower grate element also comprises valleys formed between the peak structures, the valleys having bottoms;
  Each peak structure has a cross-sectional shape comprising a top and opposing right and left side walls, wherein the right and left side walls extend from the tops of the peak structures to the bottoms of the valleys;

Each valley has a cross-sectional shape in which at least a lower portion of the valley converges as it extends downwardly to the bottom;

Openings are provided through the lower portions of the valleys;

The upper grate element comprises a series of at least substantially parallel food support ribs having upper food contacting surfaces which will be highly rust-resistant, and will most preferably remain at least substantially rust-free, at atmospheric and food cooking conditions; and The upper grate element is positionable above the lower grate element and the food support ribs are spaced apart and sized such that, when the upper grate element is positioned above the lower grate element for cooking the food product, the food support ribs will be positioned over and will run at least substantially parallel with the tops of corresponding ones of the peak structures.

As used herein and in the claims, the term "highly rust resistant" means that the material, component, or surface in question will provide and exhibit a degree of resistance to corrosion and resistance to high temperature oxidation equal to or exceeding those of an exposed stainless steel having a chromium content of at least 18% by weight. Also, as used herein and in the claims, the term "atmospheric conditions" refers to exposure to temperatures ranging from −40° F. to +120° F. and exposure to relative humidity up to 100%. Further, the term "food cooking conditions" refers to exposure to cooking temperatures up to 1000° F. and exposure to juices, grease, and fat produced when cooking meat products.

In another alternative or additional aspect, it is preferred that the openings provided in the sloped or otherwise converging lower portions of the valleys are sized and located in a manner effective for (a) allowing grease and fat drippings produced when cooking meat products on the grate assembly to drain through the openings with sufficient rapidity that at least most (preferably at least 90% by weight, more preferably at least 95% by weight, more preferably substantially all, and most preferably all) of the grease and fat drippings from the meat products will be prevented from igniting in the valleys and (b) preventing at least the majority of any flare-ups which occur beneath the lower grate element when cooking meat products on the grate assembly from penetrating upwardly through the openings.

In an alternative or additional aspect, except for the openings which are provided through the lower portions of the valleys, the peak structures will preferably be substantially unperforated. In addition, when the upper grate element is positioned above the lower grate element, the food support ribs will preferably not be positioned over the openings in the lower portions of the valleys.

In another alternative or additional aspect, when the upper grate element is positioned above the lower grate element for cooking a food product, the tops of the corresponding ones of the peak structures will preferably either (a) contact the food support ribs, (b) extend into bottom indentations or bottom openings provided in the food support ribs, or (c) both.

In another aspect, there is provided an apparatus for grilling a food product. The apparatus preferably comprises: a housing; at least one grate assembly of the type described above positioned in the housing; and a heating chamber in the housing beneath the grate assembly.

Further aspects, features, and advantages of the inventive cooking grate assembly and cooking apparatus will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
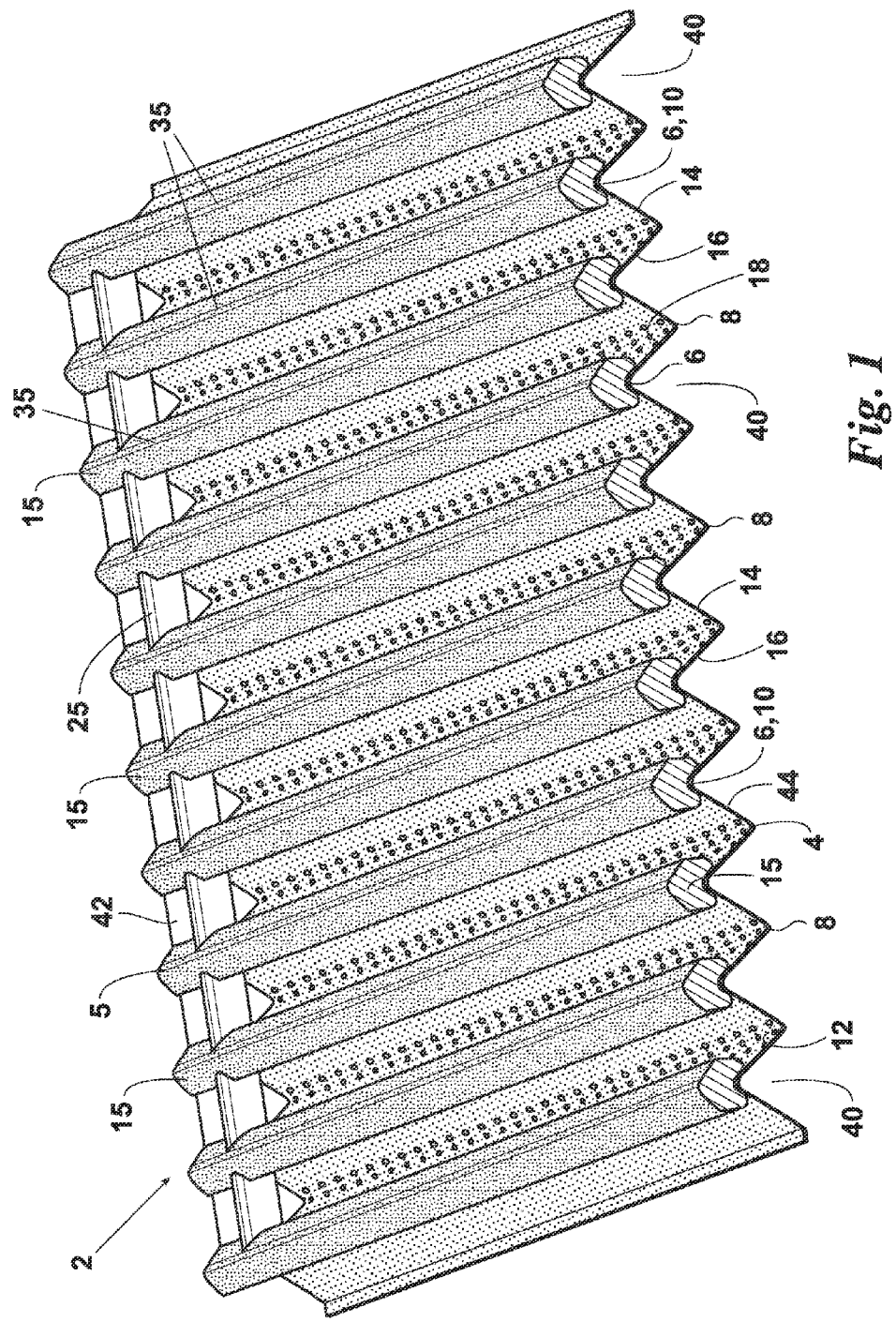
FIG. 1 is a cutaway perspective view of an embodiment 2 of the inventive cooking grate assembly.
Figure 2:
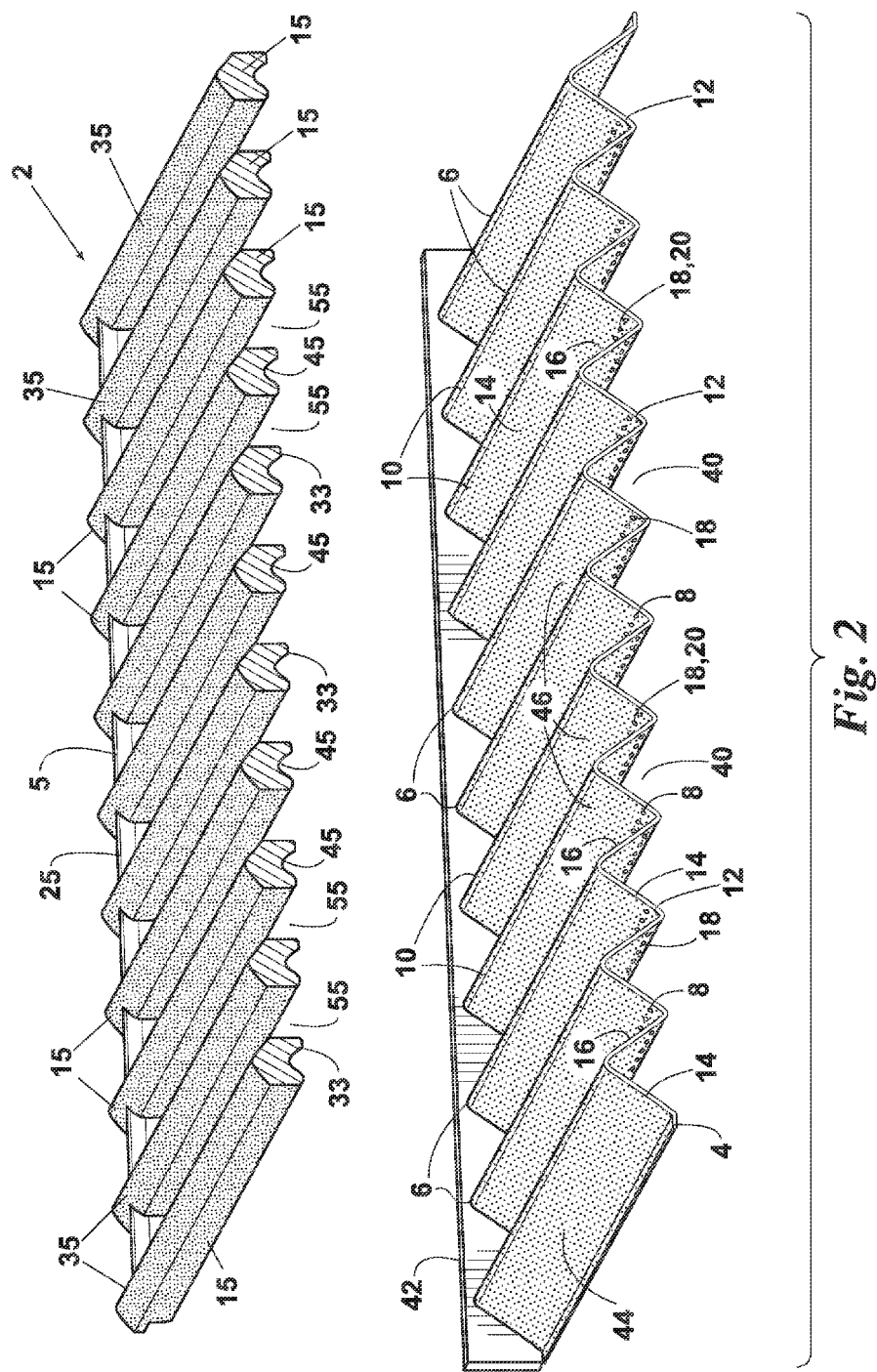
FIG. 2 is an exploded cutaway perspective view of the inventive cooking grate assembly 2 wherein the upper grate element 5 is removed from and positioned above the lower grate element 4.
Figure 3:
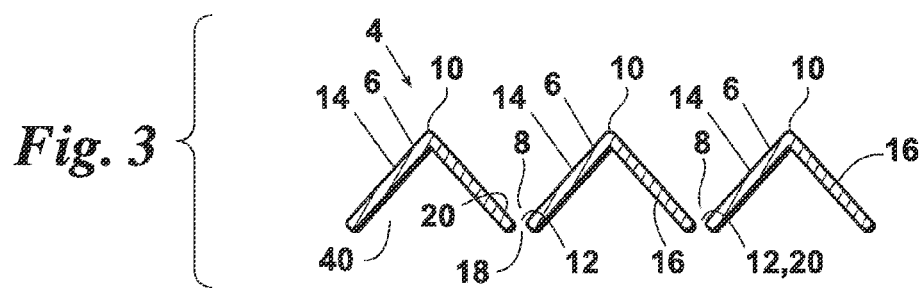
FIG. 3 schematically illustrates an elevational cutaway end view of the lower grate element 4.

An embodiment 2 of the inventive cooking grate assembly is illustrated in FIGS. 1-3. The inventive cooking grate assembly comprises a lower grate element (preferably a lower radiating plate) 4 and an upper grate element 5 which is removably positionable on top of the lower grate element 4.

The lower grate element 4 preferably comprises a series of elongate, parallel or at least substantially parallel peak structures 6 which have elongate valleys 8 formed therebetween. The cross-sectional shapes of the peak structures 6 and valleys 8 are preferably such that: the peak structures 6 have tops 10; the valleys 8 have bottoms 12; and each peak structure 6 has a right side wall 14 and an opposing left side wall 16. In addition, the right and left side walls 14 and 16 of the peak structures 6 preferably extend from the peak tops 10 to the valley bottoms 12 such that the right and left side walls 14 and 16 of each adjacent pair of peak structures 6 also form the opposing side walls of the valleys 8.

In order to provide for and facilitate the rapid drainage of fats and greases which may drip onto the lower grate element 4 when cooking meats or other food products, openings 18 are provided through the lower grate element 4 in the lower portions 20 of the valleys 8. As used herein and in the claims, the areas referred to as the "lower portions of the valleys" include, but are not limited to, the valley bottoms 12.

Moreover, in order to further facilitate rapid drainage, the cross-sectional shape of each valley 8 is preferably such that, in at least the lower portion 20 of the valley 8, the valley side walls 14 and 16 converge (e.g., slope or curve) inwardly as they extend downwardly to the valley bottom 12. Consequently, at least the lower portions 20 of the valleys 8 are preferably non-rectangular.

In embodiment 4 of the lower grate element shown in FIGS. 1-3, the peak structures 6 have an inverted V cross-sectional shape such that the opposing side walls 14 and 16 of the valleys 8 are flat structures which continuously converge along straight sloping lines from the peak tops 10 to the valley bottoms 12. The slope of the side walls 14 and 16 is preferably in the range of from about 35° to about 55° from horizontal and is most preferably about 45°.

Figure 5:
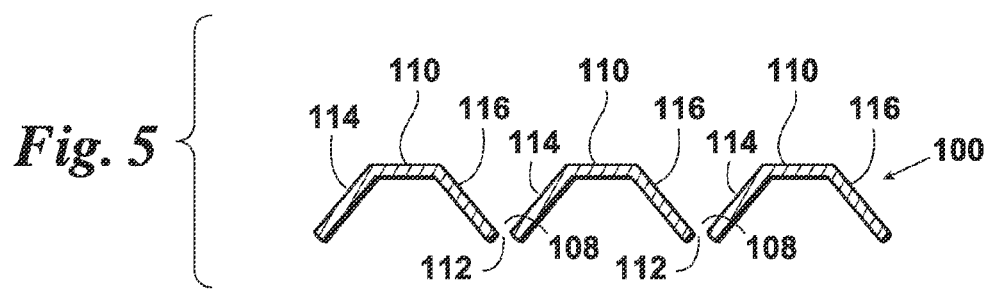
FIG. 5 schematically illustrates an elevational cutaway end view of an alternative embodiment 100 of the lower grate element.

Similarly, in an alternative embodiment 100 of the lower grate element shown in FIG. 5, the side walls 114 and 116 of the valleys 108 are flat structures which converge continuously along straight sloping lines from the peak tops 110 to the valley bottoms 112. However, in the embodiment 100 of the lower grate element, the peak tops 110 are flat.

Figure 4:
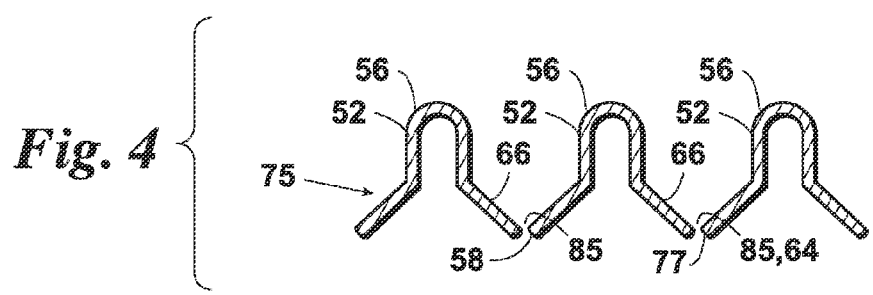
FIG. 4 schematically illustrates an elevational cutaway end view of an alternative embodiment 75 of the lower grate element.

In yet another alternative embodiment 75 of the lower grate element shown in FIG. 4, the upper portions 52 of the peak structures 56 have an inverted U-shape. However, the lower portions 85 of the valleys 58 are formed such that the valley side walls 64 and 66 in the lower portions 56 of the valleys 58 become flat structures which converge along straight sloping lines to the valley bottom 77.

Figure 6:
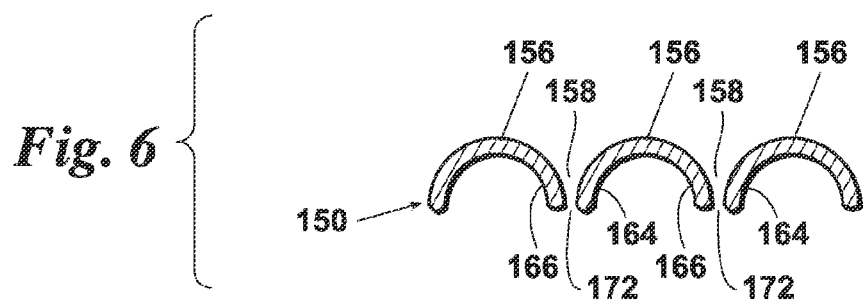
FIG. 6 schematically illustrates an elevational cutaway end view of an alternative embodiment 150 of the lower grate element.

In an example of yet another embodiment 150 of the lower grate element shown in FIG. 6, the parallel peak structures 156 have a semi-circular shape such that, when viewed from above, the converging side walls 164 and 166 of the valleys 158 are seen to be convex structures which curve continuously inward (i.e., toward each other) and downward toward the valley bottoms 172.

Figure 7:
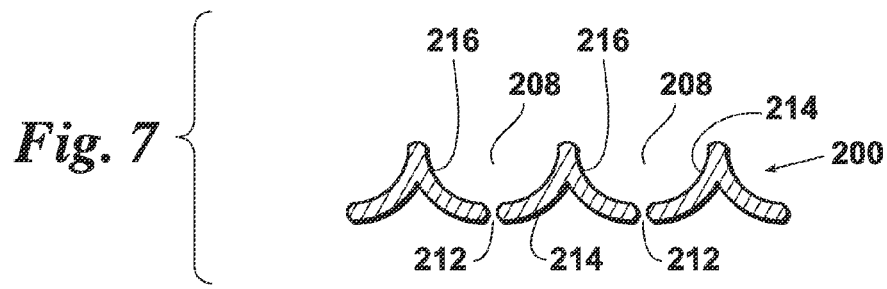
FIG. 7 schematically illustrates an elevational cutaway end view of an alternative embodiment 200 of the lower grate element.

In an example of yet another embodiment 200 of the lower grate element shown in FIG. 7, the valleys 208 themselves have a semi-circular cross-sectional shape such that, as viewed from above, the converging side walls 214 and 216 of the valleys 208 are seen as concave structures which curve continuously inward and downward toward the valley bottoms 212.

It will be understood that lower grate elements having peak structures with any combination of the cross-sectional shapes shown in FIGS. 1-7 can be manufactured and used. It will also be understood that numerous other shapes having converging side walls in at least the lower portions of the valleys can be constructed and used and are all within the scope of the present invention.

In any of the embodiments of the lower grate element shown in FIGS. 1-7 or otherwise discussed herein, the drainage openings 18 will preferably be sized and located in the sloped or otherwise converging lower portions 20 of the valleys 8 in a manner such that (a) the openings 18 will allow grease and fat drippings (i.e., the non-water drippings) produced when cooking meats or other food products to quickly drain through the openings 18 with sufficient rapidity that at least most (preferably at least 90% by weight, more preferably at least 95% by weight, more preferably substantially all, and most preferably all) of the grease and fat drippings from the meat will be prevented from igniting in the valleys 8 and (b) the openings 18 will prevent at least a majority, preferably all or at least substantially all, flare ups which may occur beneath the lower grate element 4 when cooking meats or other products on the grate assembly from penetrating upwardly through the openings 18. Such operation not only reduces or eliminates flare-ups, but also provides and maintains a higher temperature for the lower grate element 4 and increases both the energy efficiency and infrared percentage output of the inventive grate assembly.

Moreover, the entire lower grate element 4 will preferably be constructed and configured such that most, preferably all or at least substantially all, flare ups which may occur beneath the lower grate element 4 when cooking meats or other products on the grate assembly will be prevented from penetrating upwardly through any portion of the lower grate element 4. In this regard, except for the openings 18 in the lower portions 20 of the valleys 8, the peak structures 6 will most preferably be at least substantially unperforated or entirely unperforated (i.e., will have no other openings therethrough).

Figure 8:
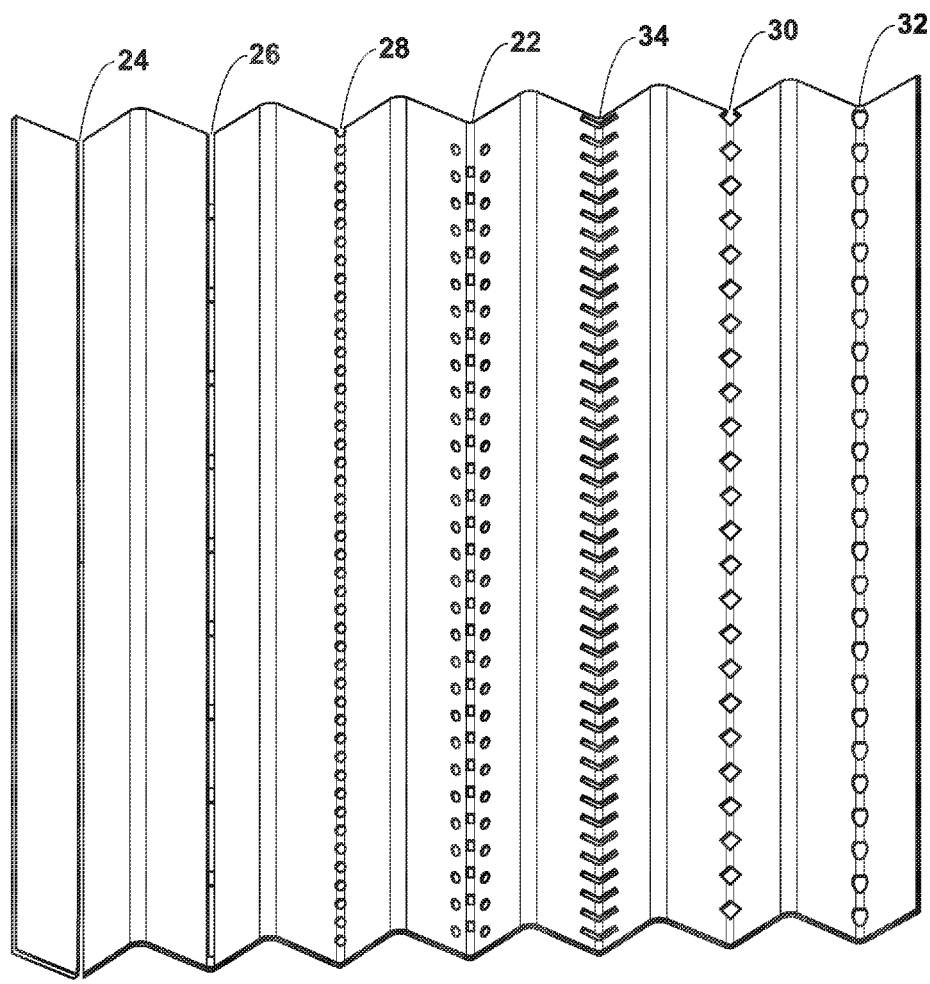
FIG. 8 schematically illustrates various types of drainage openings and drainage opening arrangements which can be used, either alone or in any combination thereof, in forming the lower grate element of the inventive grate assembly, including but not limited to any of the lower grate elements 4, 75, 100, 150, and 200 illustrated in FIGS. 1-7.

FIGS. 1, 2, and 8 illustrate various types of shapes and patterns of openings 18 which can be used either individually or in any combination thereof in the lower portions 20 of the lower element valleys 8. One arrangement 22 comprises three longitudinal rows of small circular openings. Another arrangement 24 comprises one or more narrow longitudinal slots in the bottom of the valley. Another arrangement 26 comprises a series of shorter longitudinal slots extending along the bottom of the valley. Other arrangements 28, 30, and 32 comprise a series of D-shaped or other non-circular apertures extending along the bottom of the valley. Another arrangement 34 comprises a series of narrow lateral slots extending along the bottom of the valley.

Although the openings 18 can be circular openings or can be non-circular openings of any desired length, the diameter or width of the openings will preferably be in the range of from 0.04 inch to about 0.1 inch and will most preferably be about 0.06 inch. In addition, the total open area provided by the openings 18 through the lower grate element 4 will preferably not exceed 25%, and will more preferably not exceed 20%, of the total upper surface area of the lower grate element 4. The total open area provided by openings 18 will most preferably be in the range of from about 2% to about 18% of the total upper surface area of the lower grate element 4.

In each embodiment shown in FIGS. 1-7, the peak structures 6 of the lower grate element 4 will preferably have a vertical height, extending elevationally from the bottoms 12 of valleys to the tops 10 of the peak structures 6, in the range of from about 0.25 to about 0.75 inch. The vertical height of the peak structures 6 will more preferably be in the range of from about 0.4 to about 0.6 inch. The bottom cross-sectional width of each peak structure 6 will preferably be in the range of from about 0.5 to about 1.0 inch and will more preferably be in the range of from about 0.7 to about 0.8 inch. The bottoms 40 of the peak structures 6 can be closed but will more preferably be open.

In constructing the lower grate element 4, individual peak structures 6 can be formed and attach to a single lateral end support 42 or attached between an opposing pair of such lateral end supports 42. More preferably, the successive peak structures 6 and valley structures 8 will be formed in a continuous sheet 44 of metal or other material. A lateral cross piece 42 can be formed or attached on one or both sides of the continuous sheet 44.

The upper surfaces 46 of the lower grate element 4 will preferably have an emissivity of at least 0.3 and will more preferably have an emissivity of at least 0.5. Examples of materials suitable for use in forming the lower element peak structures 6, either individually or as a part of a continuous sheet of material, include but are not limited to: stainless steel; titanium; porcelain-coated steel; steel; ceramic-coated steel; steel having other high temperature resistant coatings; porcelain-coated cast iron; ceramic-coated cast iron; and cast iron having other coatings resistant to high temperatures.

The upper grate element 5 comprises a series of parallel or at least substantially parallel food support ribs 15. The number, size, and spacing of the food support ribs 15 are preferably such that, when the upper grate element 5 is placed in operating position above the lower grate element 4, each of the support ribs 15 will be positioned over and will run parallel or at least substantially parallel with the top 10 of a correspondingly positioned peak structure 6. As illustrated in FIG. 1, the width and spacing of the food support ribs 15 will also most preferably be such that the ribs 15 are not positioned over the openings 18 provided in the valleys 8 of the lower grate element 4.

The food support ribs 15 can be individually formed and attached to a single cross-support 25 extending across one end of the upper grate element 5 or can be attached between opposing cross-supports 25 extending across both ends of the food support ribs 15. More preferably, the upper grate element 6 will be a cast structure which is formed as a single piece. In addition, the upper food contacting surfaces 35 of the food support ribs 15, as well as all other surfaces of the food support ribs 15 and the remainder of the upper grate element 5, will preferably be coated with a highly rust resistant material which will most preferably remain rust-free or at least substantially rust-free at atmospheric conditions and at the cooking temperatures and other food cooking conditions which will be experienced by the upper grate element 5.

The formation of the upper grate element 5 as a separate piece from the lower grate element 4 provides numerous significant benefits and advantages for the inventive system. Such benefits and advantages include, but are not limited to: reducing cost by requiring that the rustproof or highly rust resistant coating be applied only to the upper grate element 5; allowing the upper grate element 5 to be formed of a lower cost cast material which would be too heavy and/or otherwise unsuited for forming the entire grate assembly 2; avoiding the need to apply to the lower grate element 4 a rust-free coating which would potentially block or obstruct the lower element openings 18 and/or otherwise complicate the manufacturing process; and greatly facilitating the cleaning of the lower and upper grate elements 4 and 5 by allowing the removal of the upper grate element 5.

When the upper grate element 5 is placed in operating position above the lower grate element 4, the bottoms 33 of the food support ribs 15 will preferably not be space more than 0.5 inch above the tops 10 of the corresponding peak structures 6. More preferably, when the upper grate element 5 is placed in operating position over the lower grate element 4, the tops 10 of the peak structures 6 will either (a) contact the bottoms 33 of the food support ribs 15, (b) extend into openings or other indentations 45 formed in the bottoms 33 of the food support ribs 15, or (c) both.

As illustrated in FIGS. 1 and 2, the food support ribs 15 can be solid structures wherein the upper food contacting surface 25 has a cross-sectional rooftop shape. Alternatively, the food support ribs could have open bottoms or be hollow structures and/or could be of any desired cross-sectional shape. Examples of other suitable cross-sectional shapes include, but are not limited to, triangular shapes, semicircular shapes, circular shapes, rectangular shapes, inverted U-shapes, or other conventional rib shapes.

The height of the food support ribs 15 will preferably be in the range of from about 0.1 to about 0.75 inch and will more preferably be about 0.5 inch. The width of the food support ribs 15 will preferably be in the range of from about 0.25 inch to about 0.5 inch and will more preferably be about 0.35 inch. The width of the gaps 55 between the food support ribs 15 will preferably be in the range of from about 0.2 inch to about 0.6 inch and will more preferably be about 0.3 inch.

The material used for forming the upper grate element 5 can generally be any material which will maintain its shape at all temperatures which will be experienced in the cooking process. Examples of materials suitable for use in forming the food support ribs 15, as well as the remainder of the upper grate element 15, include, but are not limited to: cast iron, cast aluminum, cast stainless steel, cast steel, solid iron, steel, stainless steel, aluminum, and sintered metals such as pressings and laser-sintered powders.

The coating material applied to the food support ribs 15 and preferably to the entire upper grate element 5 can generally be any cooking-safe coating which can withstand, and will remain rust-free or at least substantially rust-free, at atmospheric conditions and at all cooking temperatures and other cooking conditions which will be experienced by the inventive grate assembly. The coating material will also preferably possess non-stick properties and will preferably be highly resistant to oxidation at high temperatures (i.e., temperatures of up to at least 1000° F.). Further, the coating material will preferably be effective for contributing a beneficial amount of infrared radiant energy to the cooking process.

Examples of coating systems suitable for use in coating the upper grate element 5 include, but are not limited to: black porcelain over cast iron, steel, stainless steel, or aluminum; an anodized finish on aluminum; ceramic coatings on cast iron, steel, stainless steel, or aluminum; and surface alloys deposited in vapor phase or by flame. Examples of systems preferred for use in the upper grate element 5 are black porcelain over cast iron or cast aluminum.

Figure 9:
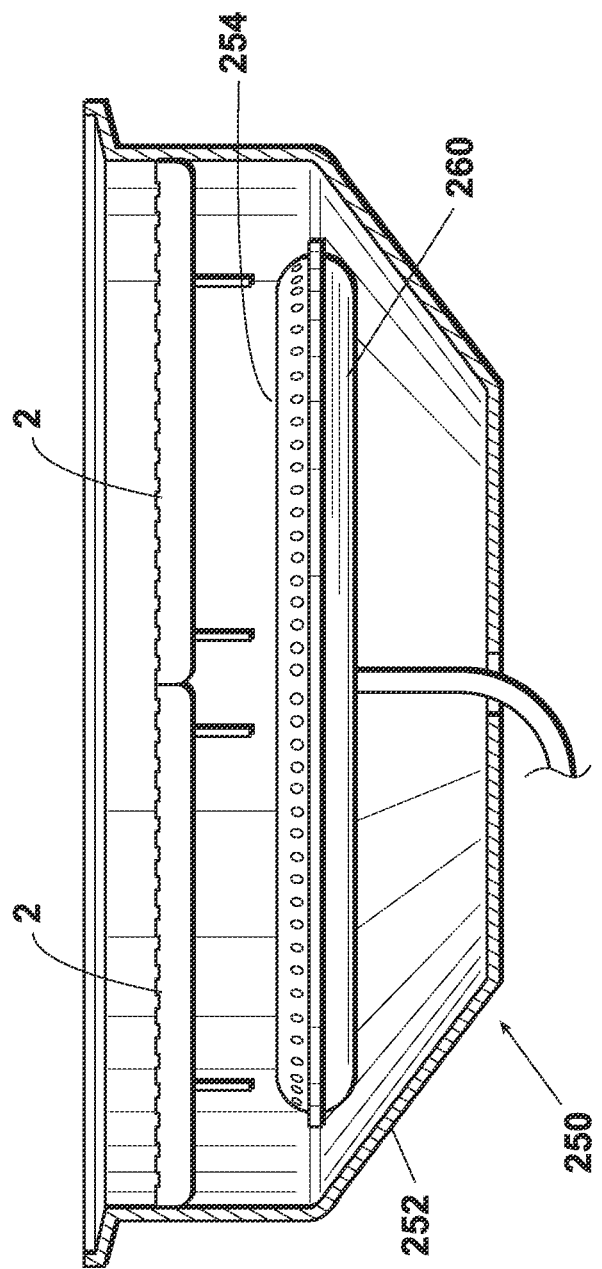
FIG. 9 is a cutaway elevational view of an embodiment 250 of the inventive outdoor cooking apparatus.

An embodiment of a grill assembly 250 provided by the present invention is illustrated in FIG. 9. The inventive grill assembly 250 comprises: a housing 252 which can optionally include a cover (not shown); at least one inventive grate assembly 2 removably positioned in the housing 252; a heating chamber 254 within the housing 252 below the one or more inventive grate assemblies 2; and a burner or other heat-producing source or element 260 provided in the heating chamber 254. The burner or other heating element or source 260 can be any type of burner, multi-tube burner, infrared burner, electric heating element, charcoal burner, wood pellet burner, charcoal bed, solid alcohol burner, or any other type of element or heat source known in the art. The grill assembly 250 will also preferably include a grease drip pan (not shown) positioned below the heating element 252.

In addition to preventing the food product from being contaminated with rust particles and flakes, substantially eliminating flare-ups, and also providing all of the other benefits and advantages discussed above, the inventive grill assembly 250 desirably provides an even heat distribution over the cooking area at the tops of the grate assemblies 2 with a high percentage of the heat delivered to the cooking area being infrared energy. Moreover, most of the infrared energy is of a particularly desirable wave length of at least 3 microns.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A grate assembly for cooking a food product comprising:
   a lower grate element having a series of substantially parallel peak structures with sidewalls extending from the peak structures to valleys therebetween;
   openings defined through lower portions of the valleys in a manner effective for (a) allowing grease and fat drippings produced when cooking meat products on said grate assembly to drain through said openings such that at least most of said grease and fat drippings will be prevented from igniting in said valleys and (b) preventing at least a majority of any flare-ups which occur beneath said lower grate element when cooking meat products on said grate assembly from penetrating upwardly through said openings; and
   an upper grate element having a series of substantially parallel food support ribs positioned above and substantially parallel to the peak structures;
   wherein except for the openings defined through lower portions of the valleys, the substantially parallel peak structures are substantially unperforated; and
   wherein as viewed from above, the openings lie between the parallel support ribs.

2. A grate assembly for cooking a food product comprising a lower grate element and an upper grate element wherein:
   said lower grate element comprises a series of at least substantially parallel peak structures;
   said lower grate element comprises valleys formed between said peak structures, said valleys having bottoms;
   each said peak structure has a cross-sectional shape comprising a top and opposing right and left side walls, wherein said right and left side walls extend from said tops of said peak structures to said bottoms of said valleys;
   each said valley has a cross-sectional shape in which at least a lower portion of said valley converges as it extends downwardly to said bottom;
   openings are provided through said lower portions of said valleys, said openings being sized and located in a manner effective for (a) allowing grease and fat drippings produced when cooking meat products on said grate assembly to drain through said openings such that at least most of said grease and fat drippings will be prevented from igniting in said valleys and (b) preventing at least a majority of any flare-ups which occur beneath said lower grate element when cooking meat products on said grate assembly from penetrating upwardly through said openings;
   said upper grate element comprises a series of at least substantially parallel food support ribs; and
   said upper grate element is positionable above said lower grate element and said food support ribs are spaced apart and sized such that, when said upper grate element is positioned above said lower grate element for cooking said food product, said food support ribs will be positioned over and run at least substantially parallel with said tops of corresponding ones of said peak structures.

3. The grate assembly of claim 2 wherein, except for said openings provided in said lower portions of said valleys, said peak structures are at least substantially unperforated.

4. The grate assembly of claim 3 wherein, when said upper grate element is positioned above said lower grate element for cooking said food product, said food support ribs will not be positioned more than 0.5 inch above said tops of said corresponding ones of said peak structures.

5. The grate assembly of claim 3 wherein, when said upper grate element is positioned above said lower grate element for cooking said food product, said tops of said corresponding ones of said peak structures will either (a) contact said food support ribs, (b) extend into bottom indentations or bottom openings provided in said food support ribs, or (c) both.

6. The grate assembly of claim 5 wherein said cross-sectional shape of said peak structures is an inverted V-shape.

7. The grate assembly of claim 5 wherein said valleys have opposing side walls and, as viewed from above, said opposing side walls of said valleys in at least said lower portions of said valleys are concave.

8. The grate assembly of claim 5 wherein, as viewed from above, at least said lower portions of said valleys are concave.

9. The grate assembly of claim 5 wherein said food support ribs are solid structures having bottom indentations wherein said tops of said corresponding ones of said peak structures are received.

10. The grate assembly of claim 5 wherein:
    said peak structures have a vertical height, extending elevationally from said bottoms of said valleys to said tops of said peak structures, in a range of from about 0.25 to about 0.75 inch;
    said peak structures have a cross-sectional width in a range of from about 0.5 to about 1 inch;
    said food support ribs have a vertical height in a range of from about 0.125 to about 0.75 inch; and
    said food support ribs have a cross-sectional width in a range of from about 0.25 to about 0.5 inch.

11. The grate assembly of claim 10 wherein said food support ribs are spaced apart to provide a gap width between said food support ribs in a range of from about 0.2 to about 0.6 inch.

12. The grate assembly of claim 10 wherein said openings have diameters or widths in a range of from about 0.04 to about 0.1 inch.

13. The grate assembly of claim 10 wherein a total open area provided by said openings does not exceed 20% of a total upper surface area of said lower grate element.

14. The grate assembly of claim 2 wherein said food support ribs comprise a cast material having a high temperature oxidation resistant coating thereon.

15. The grate assembly of claim 14 wherein said cast material is cast iron.

16. The grate assembly of claim 14 wherein said cast material is cast aluminum.

17. The grate assembly of claim 14 further comprising a black porcelain coating on the food support ribs.

18. A grate assembly for cooking a food product comprising a lower grate element and an upper grate element wherein:
    said lower grate element comprises a series of at least substantially parallel peak structures;
    said lower grate element comprises valleys formed between said peak structures, said valleys having bottoms;
    each said peak structure has a cross-sectional shape comprising a top and opposing right and left side walls, wherein said right and left side walls extend from said tops of said peak structures to said bottoms of said valleys;

each said valley has a cross-sectional shape in which at least a lower portion of said valley converges at it extends downwardly to said bottom;

except for openings which are provided through said bottoms of said valleys, said peak structures are at least substantially unperforated;

said openings have diameters or widths in a range of from about 0.04 to 0.1 inches and a total open area provided by said openings does not exceed 25% of a total upper surface area of said lower grate element;

said upper grate element comprises a series of at least substantially parallel food support ribs; and said upper grate element is positionable above said lower grate element and said food support ribs are spaced apart and sized such that, when said upper grate element is positioned above said lower grate element for cooking said food product, said food support ribs will be positioned over and run at least substantially parallel with said tops of corresponding ones of said peak structures and said openings in said bottoms of said valleys will be between said food support ribs.

19. The grate assembly of claim 18 wherein, when said upper grate element is positioned above said lower grate element for cooking said food product, said tops of said corresponding ones of said peak structures will either (a) contact said food support ribs, (b) extend into bottom indentations or bottom openings provided in said food support ribs, or (c) both.

20. The grate assembly of claim 18 wherein:

said peak structures have a vertical height, extending elevationally from said bottoms of said valleys to said tops of said peak structures, in a range of from about 0.25 to about 0.75 inch;

said peak structures have a cross-sectional width in a range of from about 0.5 to about 1 inch;

said food support ribs have a vertical height in a range of from about 0.125 to about 0.75 inch; and said food support ribs have a cross-sectional width in a range of from about 0.25 to about 0.5 inch.

* * * * *